UNITED STATES PATENT OFFICE.

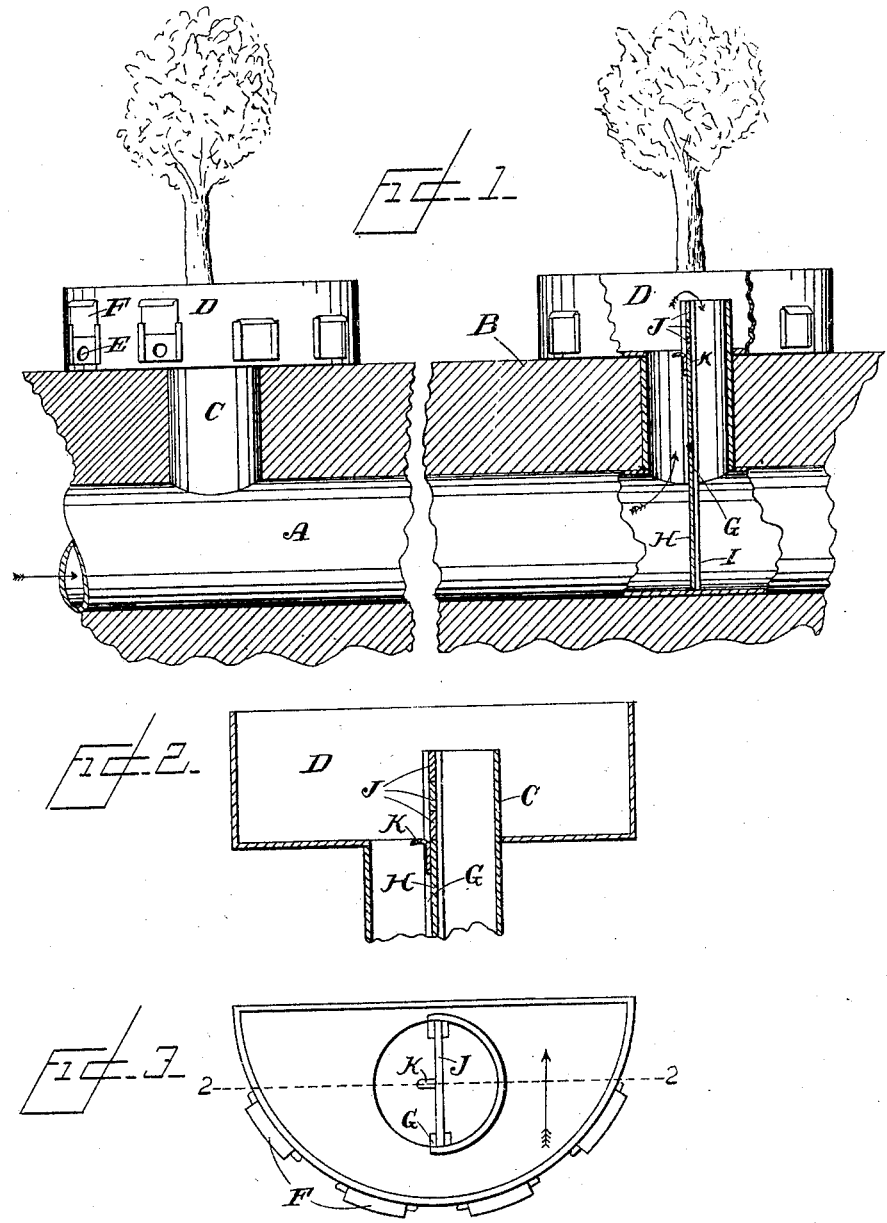

JOSEPH H. MARTIN, OF RIVERSIDE, CALIFORNIA.

IRRIGATING APPARATUS.

No. 796,590.     Specification of Letters Patent.     Patented Aug. 8, 1905.

Application filed April 15, 1903. Serial No. 152,789.

*To all whom it may concern:*

Be it known that I, JOSEPH H. MARTIN, a citizen of the United States, residing at Riverside, in the county of Riverside and State of California, have invented new and useful Improvements in Irrigating Apparatus, of which the following is a specification.

My invention relates, primarily, to an apparatus for irrigating through the central portion of an orchard; and the object thereof is to provide an apparatus which permits of such irrigating without interfering with the cultivation of the surface of the ground between the trees and in which the flow of the water is easily regulated. I accomplish these objects by the apparatus described herein and illustrated in the accompanying drawings, in which—

Figure 1 is a side elevation, partly in section, of so much of my apparatus in place in an orchard as is necessary to illustrate the same. Fig. 2 is an enlarged sectional elevation of a basin and the top of the vertical pipe. Fig. 3 is a plan of a basin and pipe.

In orchards where irrigation is necessary it is desirable that the rows of trees shall be longer than it is practical to successfully irrigate the same from the ends of the rows. It is then necessary that a central irrigating-pipe shall be run centrally through the orchard, so that each row may be irrigated from the end and from the center. In such cases it is desirable that the central irrigating-pipe shall be as little in the way of cultivation as possible. To that end the main irrigating-pipe A, connected to a suitable source of water, (not shown,) is buried in the ground B as far as is necessary so as not to interfere with the cultivation of the surface of the ground. At each row of trees a vertical pipe C connects with the main pipe and opens into a basin D, which is provided with a plurality of outlets E, through which the water (not shown) flows to the irrigating-furrows. (Not shown.) These outlets are controlled by the usual gates F. Each vertical pipe is provided with guides G on each side thereof, which extend from the top to the bottom thereof. These guides are preferably centrally located and hold gate H in place to divide the pipe from the bottom of the basin to the main pipe into two parts. This gate also extends down into and across the main pipe and is supported at the back thereof by supports I, affixed to the main pipe. This gate and the supports I cut off the flow of the water which flows in the direction indicated by the arrows and cause it to flow up one side of the vertical pipe into the basin and then down through the other side and on through the main pipe. Nearly one-half of the vertical pipe is cut away in the basin, so that as soon as the water rises to the basin it immediately begins to fill the same and fills it to the height of the other portion of the pipe which is not cut away, thereby giving a pressure on the water flowing out of the outlets of the basin proportioned to the height of the water therein. As it is desirable to regulate this pressure, I have provided regulating-boards J, which are placed in the guides on top of gate H. I have shown three of these boards, which enables me to have four different pressures of the water in the basin, which is accomplished by removing one or two or three of the boards. Should none of the water be required at some of the rows, gate H is raised to permit the water in the main pipe to flow under it, handle K being affixed thereto to enable it to be easily raised. If desired, this gate may be raised to permit a portion of the water to flow under it and the remainder to flow up into the basin. These basins may be of any suitable size and shape; but I prefer a semicircular shape, as that enables me to easily connect the irrigating-furrows with the outlets. They may be of any depth required to give the necessary pressure on the water flowing out of the outlet, the vertical pipe being made of the required height therefor. By making the vertical pipe of the same capacity on each side of gate as the main pipe and the gate H heavy enough the supports in the main pipe for the end of the gate may be dispensed with. By making gate H a little longer the regulating-boards can be dispensed with where only one pressure in the basin is desired; but to obtain a proper regulation of the pressure of water at the outlets a portion must flow up one side of the vertical pipe and down the other.

Having described my invention, what I claim as new, and desire to secure by Letters Patent, is—

1. In an irrigating system a main irrigating-pipe buried beneath the ground; a vertical pipe extending from said main pipe to a distance above the surface of the ground, and having an outlet at the surface of the ground on the side thereof toward the source of water-supply; vertical guides in said vertical pipe lying in a plane at right angles to the line of direction of the main pipe; a movable gate in said guides, said gate extending across said main pipe and cutting off the flow of water therethrough and projecting upwardly in said vertical pipe to the outlet thereof; regulating-boards in said guides and resting on said movable gate.

2. In an irrigating system a main irrigating-pipe buried beneath the ground; a basin having outlets therefrom in the sides thereof upon the surface of the ground; a vertical pipe having guides in the sides thereof connected to said main pipe and extending up into said basin and having the upper part or portion of the same within the basin cut away, said basin being on that side of said guides toward the water-supply; a gate in the guides in said vertical pipe movable therein and extending from the bottom of said basin to and across said main pipe and adapted to cut off the flow of water therethrough; regulating-boards in the guides in the vertical pipe above the said gate.

In witness that I claim the foregoing I have hereunto subscribed my name this 6th day of April, 1903.

JOSEPH H. MARTIN.

Witnesses:
JOHN THOMASON,
W. A. ANDERSON.